United States Patent [19]

Anderson

[11] Patent Number: 5,503,885
[45] Date of Patent: Apr. 2, 1996

[54] ARTICLE WITH POSITION-DEFINING STRUCTURE AND METHOD AND APPARATUS FOR MAKING AND PROCESSING SAME

[75] Inventor: Paul A. Anderson, Arlington Heights, Ill.

[73] Assignee: Weiler Engineering, Inc., Arlington Heights, Ill.

[21] Appl. No.: 285,886

[22] Filed: Aug. 4, 1994

Related U.S. Application Data

[63] Continuation of Ser. No. 780,803, Oct. 22, 1991, abandoned.
[51] Int. Cl.⁶ .............................. B65D 1/08; B65D 17/28; B65D 85/62
[52] U.S. Cl. ............... 428/35.7; 428/542.8; 428/36.92; 264/527; 264/536; 83/914; 206/438; 206/530; 206/532; 206/820
[58] Field of Search ............................ 206/820, 438, 206/530, 532, 539

[56] References Cited

U.S. PATENT DOCUMENTS

| | | | |
|---|---|---|---|
| 3,032,823 | 5/1962 | Sherman | 425/525 |
| 3,448,648 | 6/1969 | Magruder et al. | 83/566 |
| 4,070,429 | 1/1978 | Uhlig | 264/527 |
| 4,323,411 | 4/1982 | Uhlig | 425/525 |
| 4,361,531 | 11/1982 | Black | 425/525 |
| 5,156,798 | 10/1992 | Bruning | 264/536 |

FOREIGN PATENT DOCUMENTS

| | | |
|---|---|---|
| 0326529 | 8/1989 | European Pat. Off. . |
| 0359971 | 3/1990 | European Pat. Off. . |
| 3141069 | 5/1983 | Germany . |

*Primary Examiner*—Ellis P. Robinson
*Assistant Examiner*—Rena L. Dye
*Attorney, Agent, or Firm*—Olson & Hierl, Ltd.

[57] ABSTRACT

An article, such as a card of thermoplastic material containing vials, is molded by a method and apparatus which deforms a portion of the mold flash so as to form a reference surface. In a preferred embodiment, the article has a pair of lower walls extending from a central wall in a generally inverted V-shape configuration diverging from an apex which defines a downwardly facing reference surface from which a predetermined reference position can be established for subsequent operations. A conveyor belt can be employed to engage the reference surface and support the article at the reference position.

7 Claims, 9 Drawing Sheets

U.S. Patent    Apr. 2, 1996    Sheet 1 of 9    5,503,885
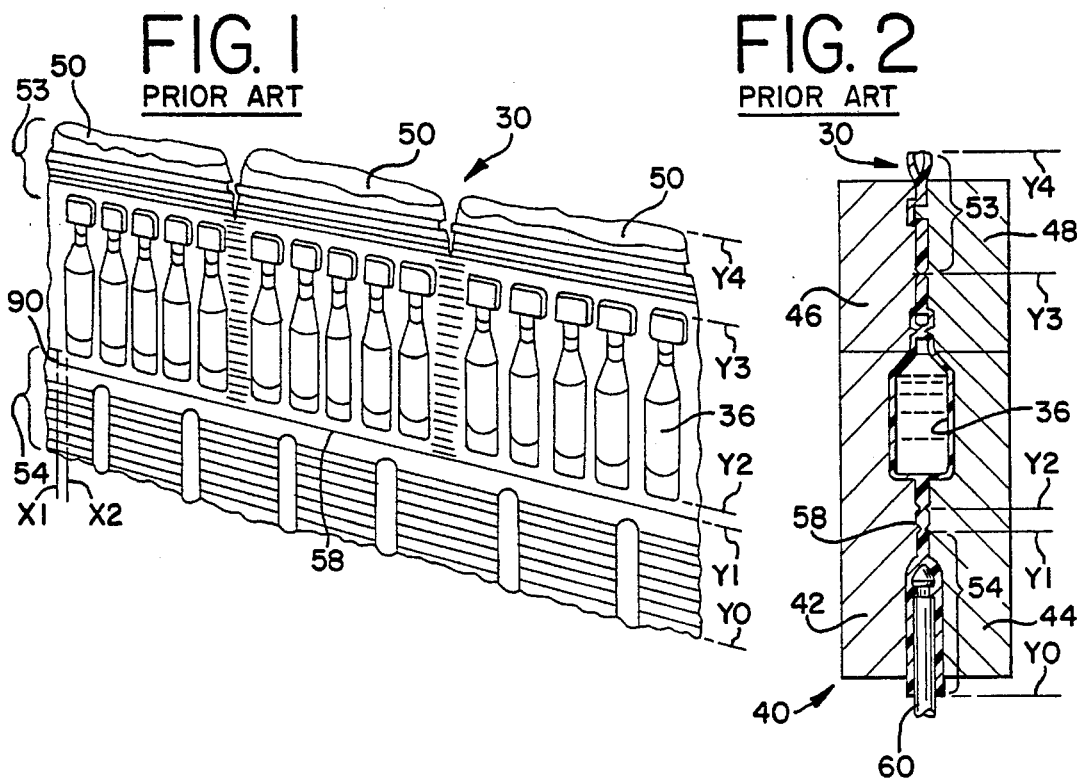
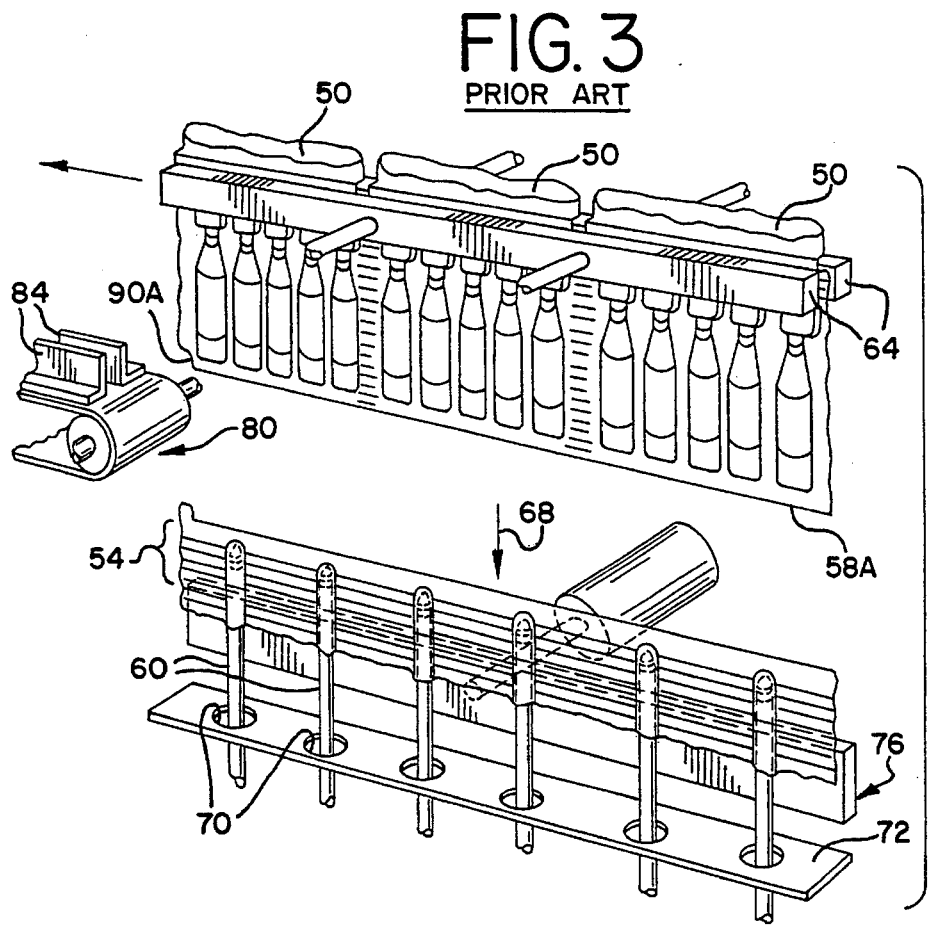

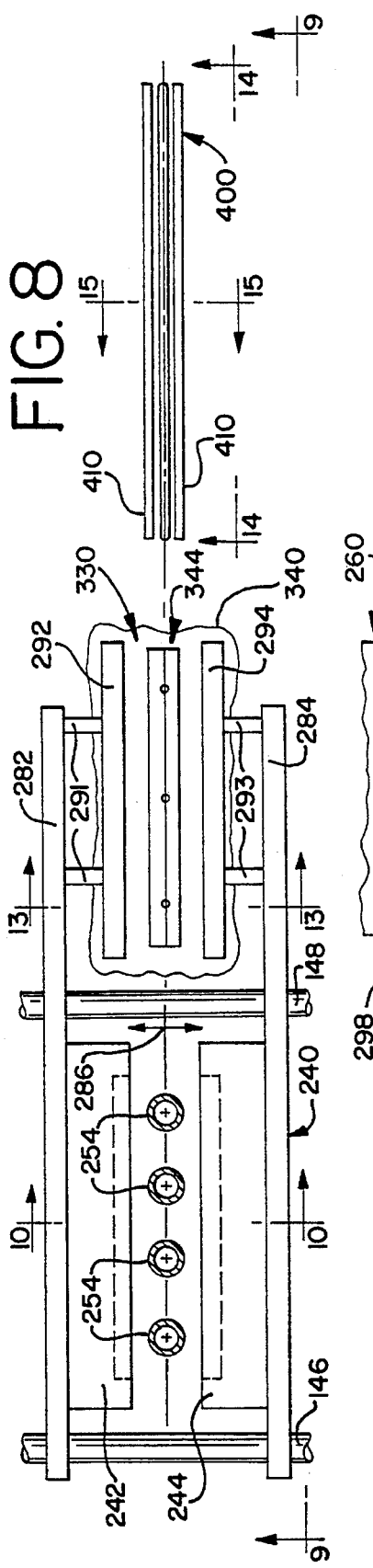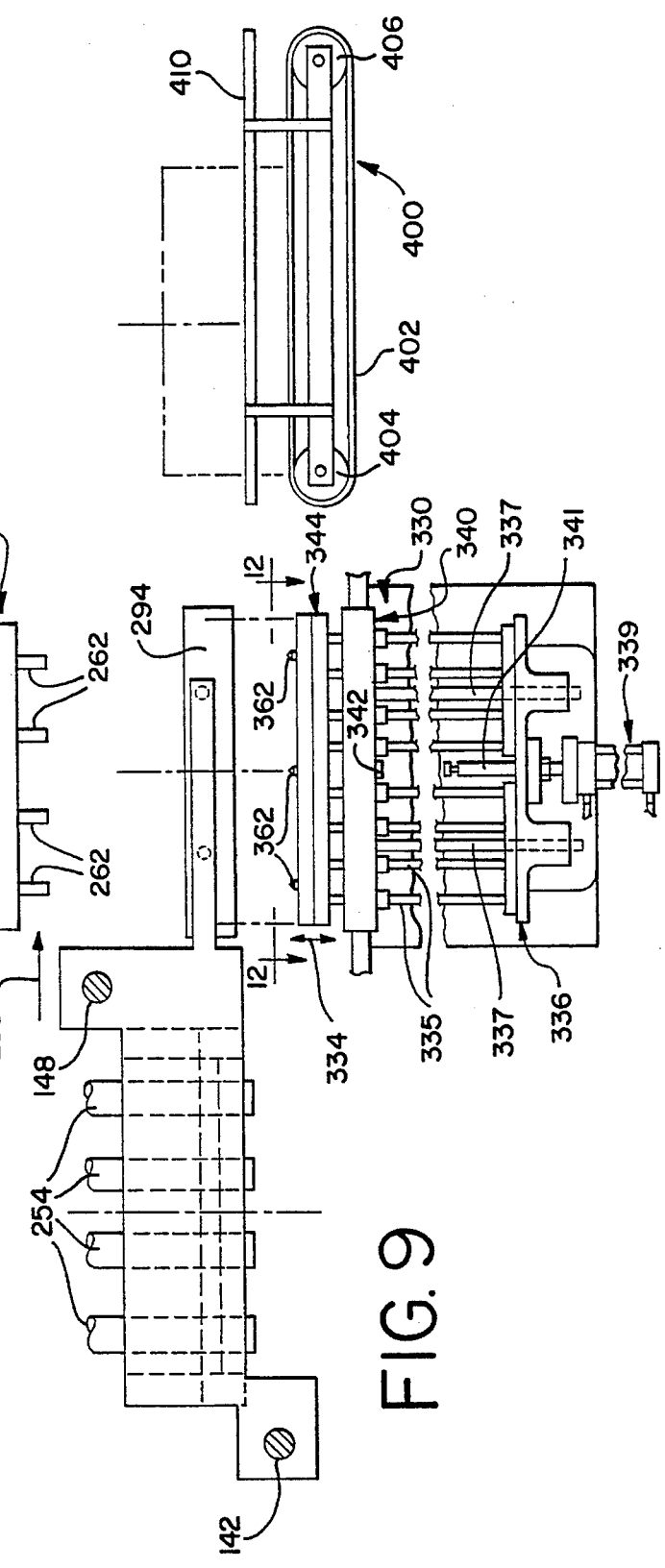

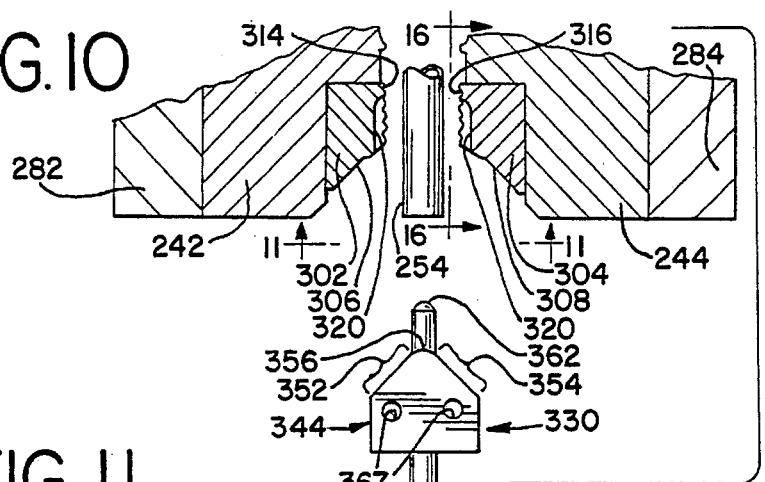
FIG. 10
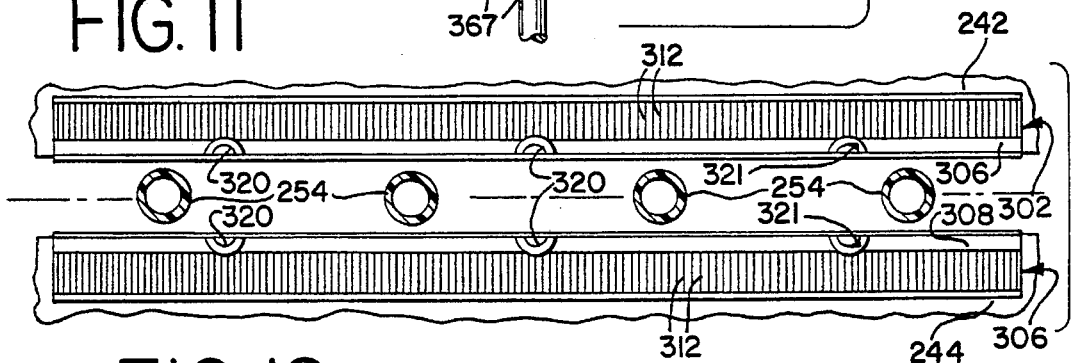
FIG. 11
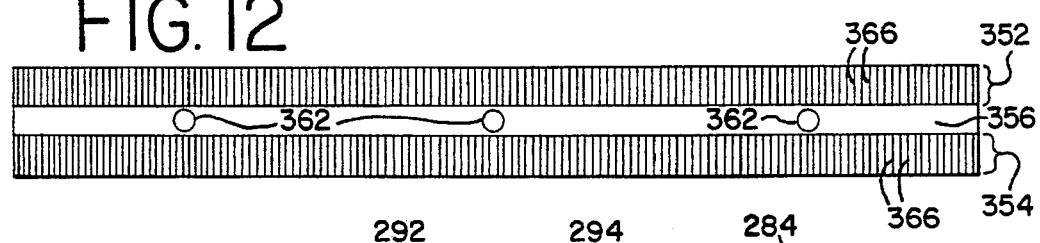
FIG. 12
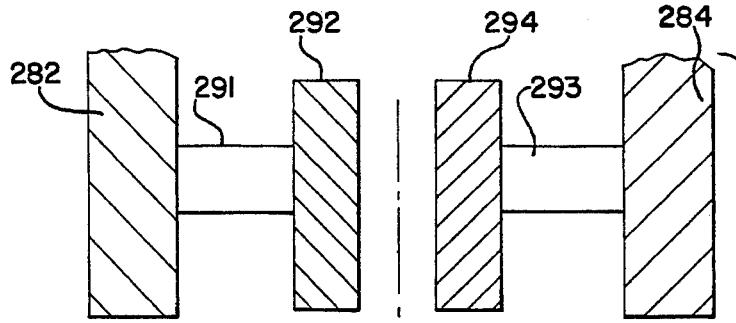
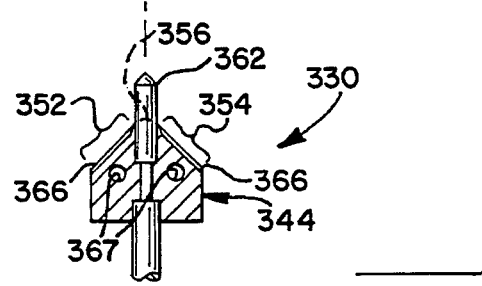
FIG. 13

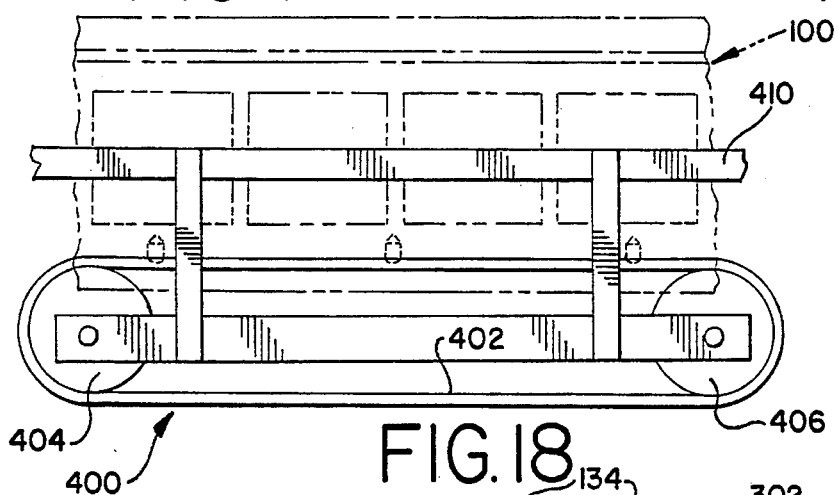
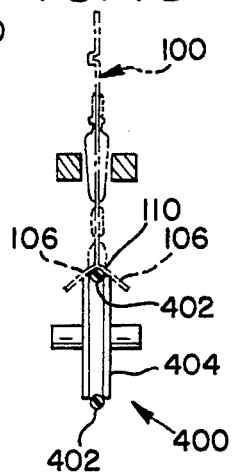
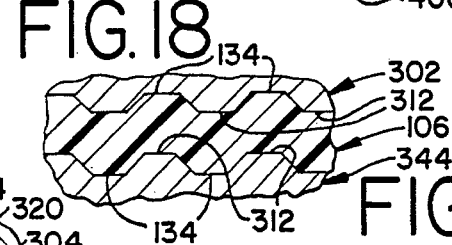
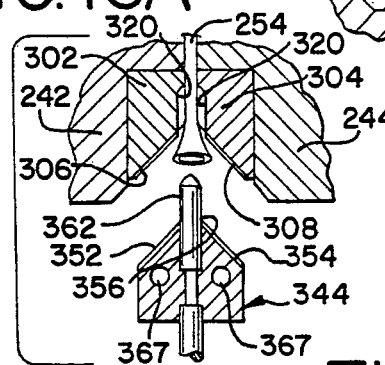
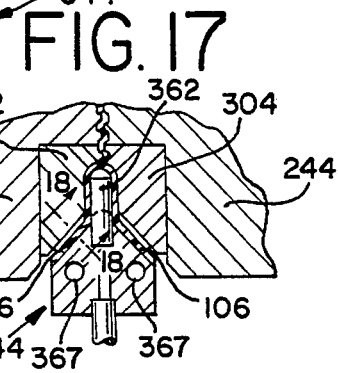
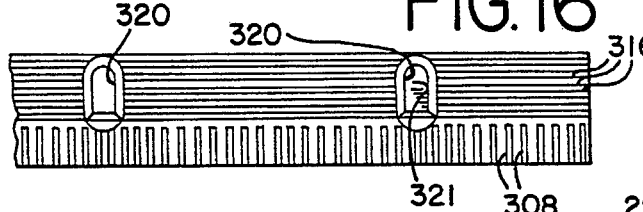
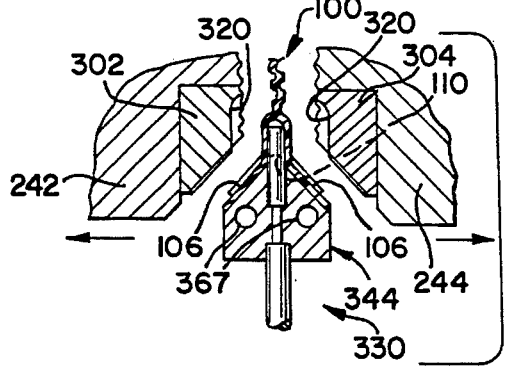
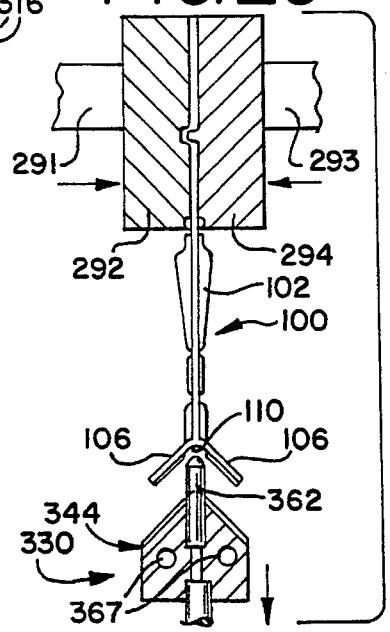

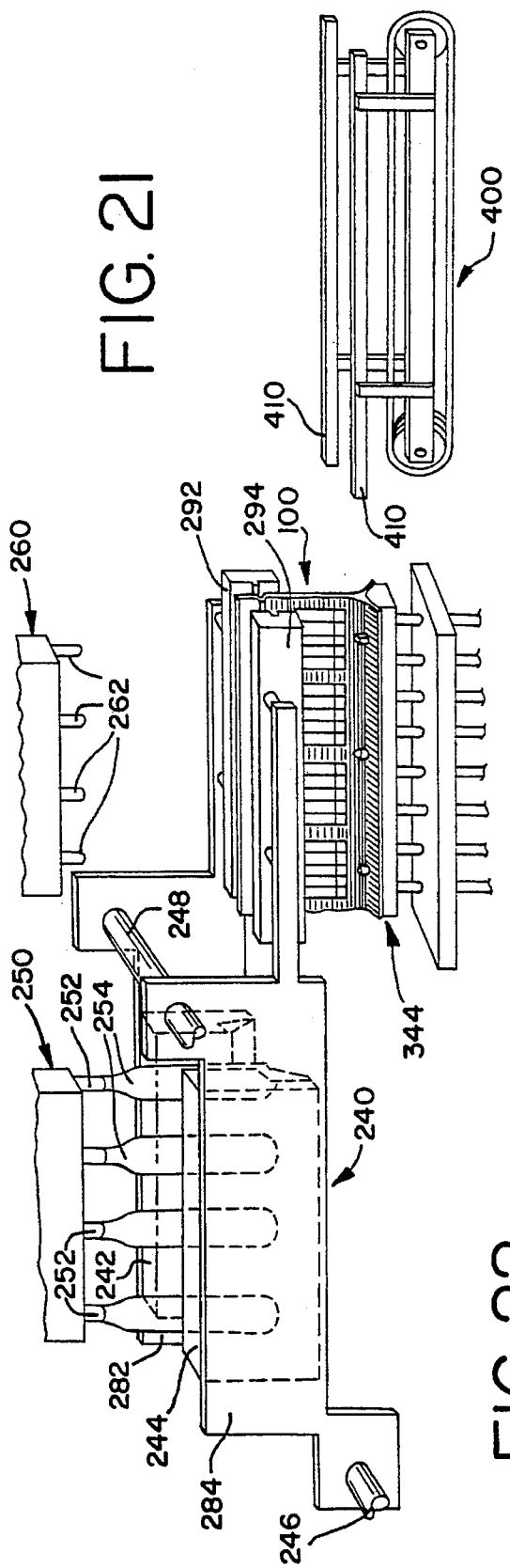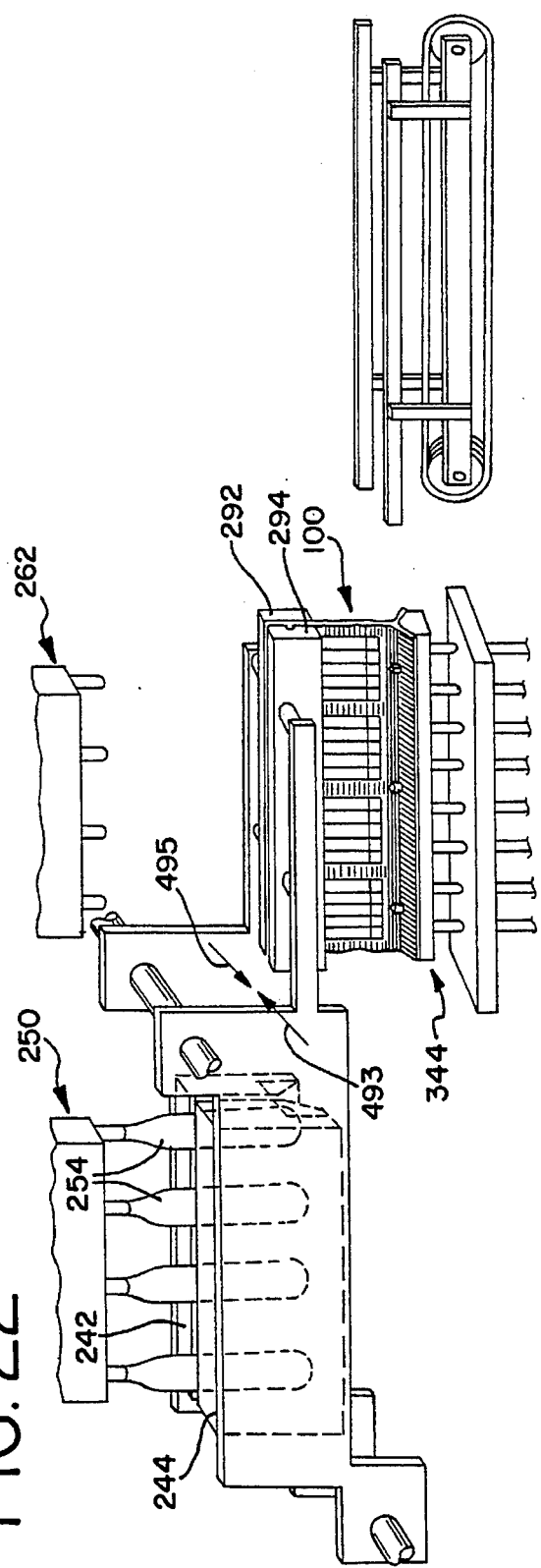

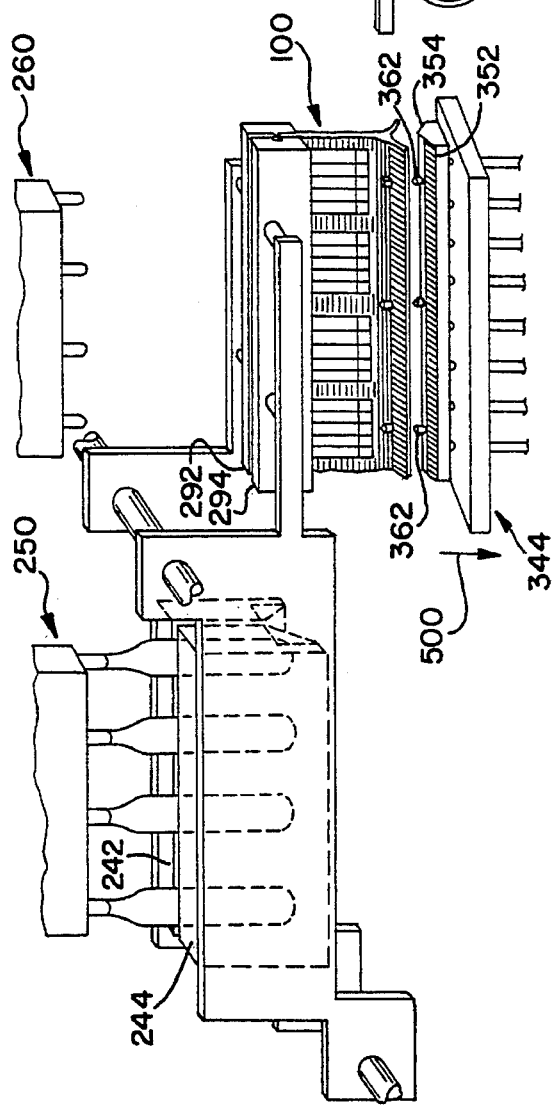
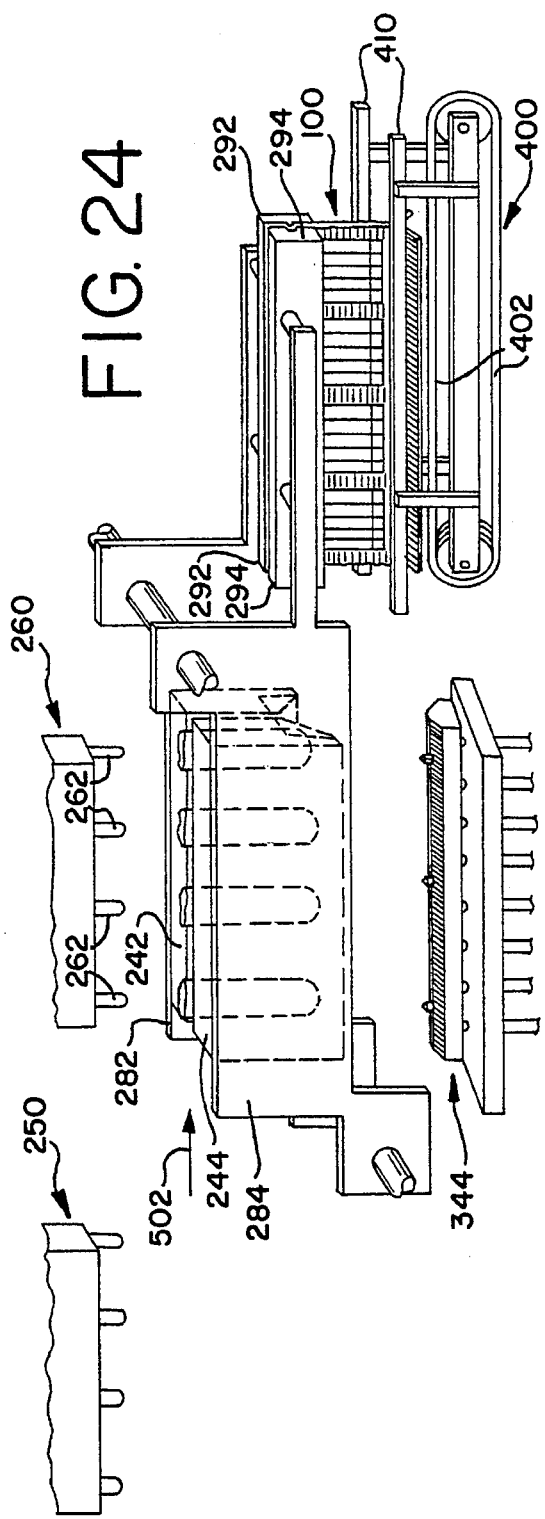

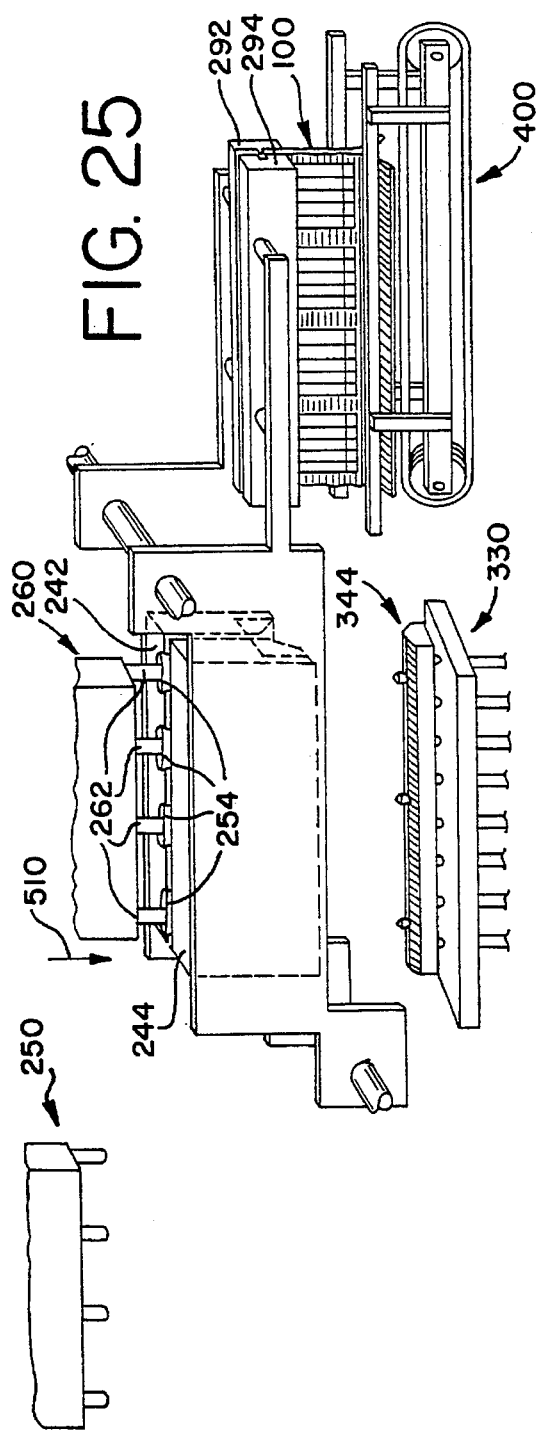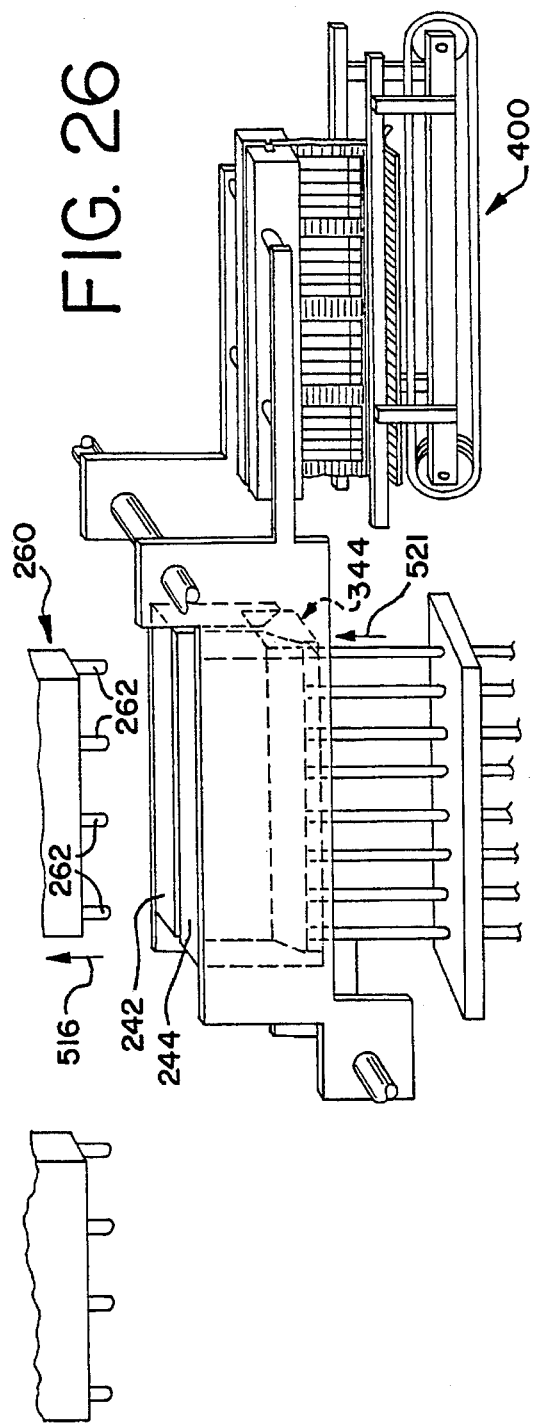

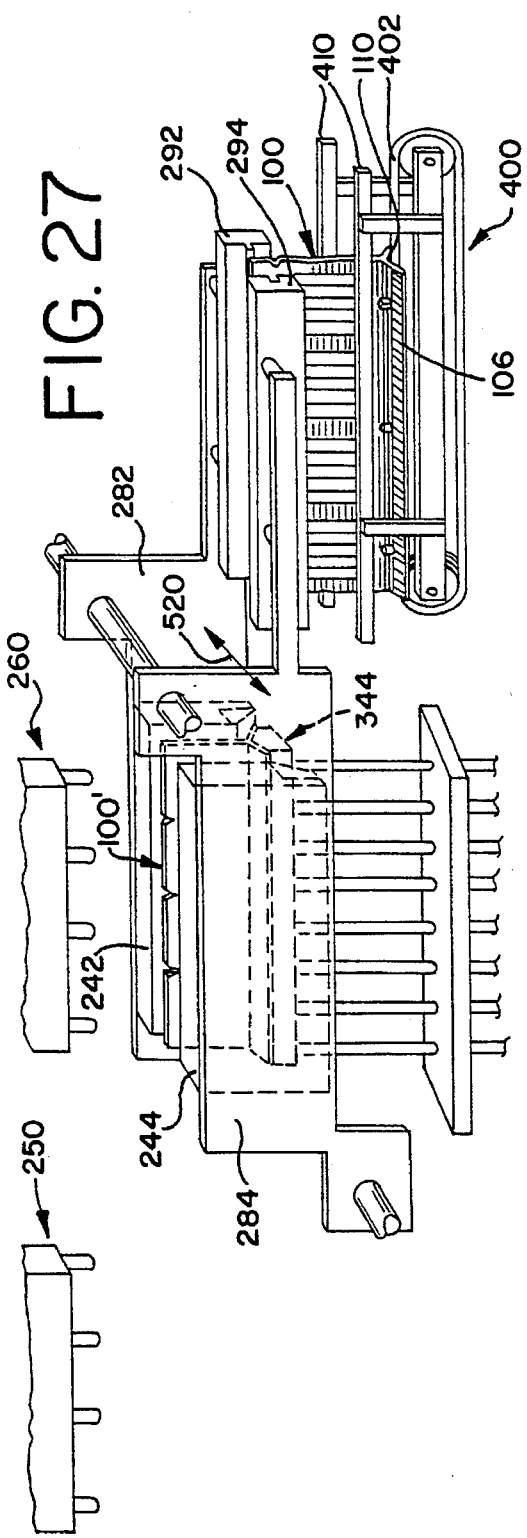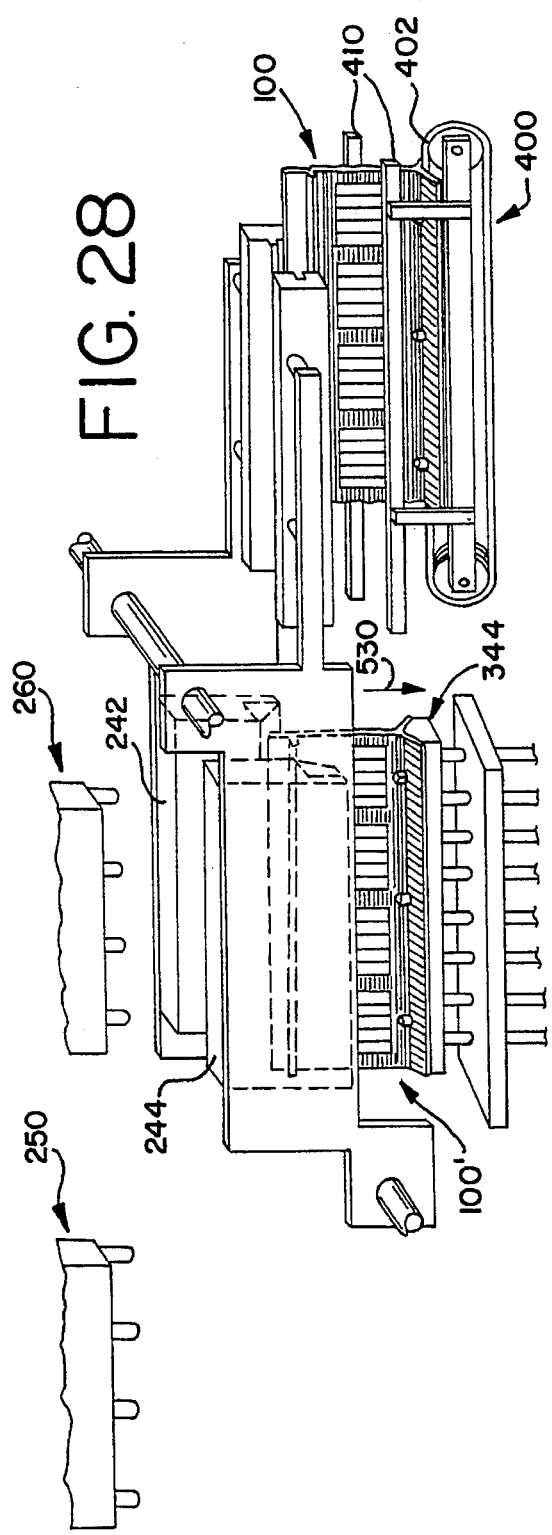

ARTICLE WITH POSITION-DEFINING STRUCTURE AND METHOD AND APPARATUS FOR MAKING AND PROCESSING SAME

This application is a continuation, of application Ser. No. 07/780,803, filed Oct. 22, 1991, now abandoned.

TECHNICAL FIELD

This invention relates to molded thermoplastic articles with position-defining surfaces, to methods and apparatus for molding such articles, and to processes and apparatus for conveying articles, molded or otherwise, which incorporate such position-defining surfaces.

BACKGROUND OF THE INVENTION AND TECHNICAL PROBLEMS POSED BY THE PRIOR ART

A well-known and effective method for packaging pharmaceutical products and other sterile products employs machinery to automatically form a container, fill the container with the product, and then hermetically seal the product within the molded container. This process can be carried out by a "form-fill-seal machine" for which designs are known. See, for example, U.S. Pat. No. 3,597,793 to Weiler, U.S. Pat. No. 3,919,374 to Komendowski, U.S. Pat. No. 4,176,153 to Weiler et al., U.S. Pat. No. 4,178,976 to Weiler et al., U.S. Pat. No. 4,707,966 to Weiler et al., and patents cited therein.

In this packaging method, described in the patents identified above, a length of parison is extruded from an extruder head in the form of a vertically oriented, elongated, hollow tube of semi-molten thermoplastic material (i.e., in a plastic state). Before, during, or after the parison is extruded to the desired length, a split mold assembly of two main mold halves is positioned in spaced relationship from and around the parison.

Next, with collapse of the upper end of the parison prevented by holding jaws, the parison is severed, above holding jaws and below the extruder head, in a conventional manner (e.g., by means of a moving cutter, such as a hot wire or the like).

The main mold halves are then moved together to a closed position, and in this position cooperate to define a cavity for the container around the parison.

The closed mold assembly is then moved away from the extruder head to a molding, filling, and sealing station. Molding can be effected by blow forming, vacuum forming, or a combination of both of the foregoing expedients depending on container size. Typically, a vertically reciprocable composite blowing and filling mandrel is provided in registry with the opening at the upper end of the severed length of the parison. The mandrel is extended downwardly into the opening of the upper end of the severed length of the parison to seal the parison opening with the mandrel and to press the parison against the mold. The mandrel includes a blowing tube and a filling tube.

In operation, compressed gas, such as air or the like, is discharged through the mandrel blowing tube into the interior of the hollow parison to inflate the parison outwardly against the walls of the cavity (with or without vacuum assist through small passageways in the molds), and this forms the container body.

Next, the filling tube inside the composite mandrel is reciprocated downwardly to open a vent passage in the mandrel to permit venting of the compressed gas out of the molded container. Subsequently, the blowing tube is moved downwardly a small amount within the mandrel to open the product dispensing valve and permit the product to be injected under pressure from the filling tube into the formed container.

After the formed container has been filled with the desired amount of product, the composite mandrel is withdrawn from the open of the parison. The top of the open container is then sealed by moving sealing molds together to hermetically seal the top of the formed container. If desired, an insert, such as a dispensing nozzle, rubber stopper, or the like, can be incorporated in the top of the container as taught by, for example, U.S. Pat. No. 4,821,897.

After the top of the container has been sealed, the sealing molds and main mold halves are opened to expose the completed container so that the container can be removed. In large scale production applications, a plurality of containers are typically formed in a single mold assembly. Such a mold assembly defines a plurality of mold cavities and is adapted to cooperate with a plurality of extruder heads, holding jaws, blowing and filling mandrels, and sealing molds. The parisons are typically extruded in a spaced-apart line between the main mold halves. When the main mold halves close, the thermoplastic material is spread between the parisons, and the containers are molded within a unitary connecting web, carrier, or card of thermoplastic material.

Prior art expedients for the removal of a container card from the mold assembly are shown in FIGS. 1–4. Specifically, FIG. 1 illustrates such a container carrier or card 30, and FIG. 2 shows the card 30 in a closed mold assembly 40 after the containers, in the form of small vials 36, have been formed between main mold halves 42 and 44, then filled with product, and finally sealed between sealing mold halves 46 and 48.

The production of a plurality of containers at one time in a single mold assembly is especially suitable for the manufacture of small vials of a sterile product. For example, for a 1 ml container size, five such containers may be formed in a side-by-side array from one parison (the parison being shown in FIG. 1 as having a flattened, solidified configuration 50 in the molded card 30). Three or four such parisons may be positioned simultaneously in a side-by-side array within a single mold assembly 40 to produce the molded composite article or card 30 with a total of 15 or 20 molded containers 36 carried therein. Such a conventional carrier or card 30 may have, for example, a length of about 14 inches and a height of about six or seven inches.

Each of the formed, filled, and sealed containers 36 is connected, about its periphery on the parting plane to the carrier or card 30 by frangible, reduced thickness portions of the thermoplastic material. The containers 36 can be removed from the card 30 by punching, knocking, or pushing the containers so as to break the reduced thickness sections. This is typically accomplished at conventional "deflashing" stations downstream from the mold assembly.

With reference to FIGS. 1 and 2, the vertical location of the top of the container structure is designated as Y3 and the vertical location of the bottom of the container structure is designated as Y2. The distance between Y2 and Y3 typically is constant along the length of the card 30.

In order to accurately knock the containers 36 out of the card 30, positions of the containers 36 relative to the surrounding card 30 must be established. This can be done automatically by providing one or more defined reference surfaces on the card 30 which can be engaged by the processing apparatus.

When the containers 36 are molded with the card 30 in the mold assembly, the tops and bottoms of the parisons typically project beyond the mold cavities and are irregularly deformed as mold flash, such as top flash 53 and bottom flash 54 (FIG. 1). The mold flash does not have any flat surface or other uniform surface which can be used to define a reference position. Thus, the vertical distance from the edge of the flash to an adjacent container 36 carried in the card 30 is not constant along the length of the card 30. That is, with reference to FIGS. 1 and 2, the elevation Y4 of the top of the upper flash 53 and the elevation Y0 of the bottom of the lower flash 54 are vertically variable along the length of the card 30. It is thus not possible to establish a uniform vertical distance from either the top or bottom edge of the card flash to the containers 36 for purposes of vertically aligning deflashing apparatus or knock-out devices for knocking the containers out of the card 30.

A conventional process attempts to solve this problem by providing a uniform surface in the bottom flash 54. Specifically, as shown in FIG. 2, the flash 54 extending below the molded containers 36 in the carrier or card 30 is molded with a straight, frangible web 58 oriented parallel to the bottoms of the containers 36 and located at an elevation Y1 which is a predetermined distance below the container bottoms at Y2. Further, the portion of the parison below the frangible web 58 is molded around upwardly projecting carrier pins 60. Thus, after the mold assembly 40 is opened, the card 30 along with the containers 36 therein, remains held by the pins 60 along the bottom edge of the flash 54 below the frangible web 58. Clamping members 64 (FIG. 3) then grip the top of the card 30 and hold it while the pins 60 are moved downwardly to tear off the bottom portion of the card flash 54 at the frangible web 58 to leave a substantially straight surface 58A along the bottom of the remaining card portion.

FIG. 3 shows the pins 60 pulling the bottom flash 54 downwardly in the direction of the arrow 68 and away from the remaining portion of the card 30. The pins 60 are aligned to move through holes 70 in a stripper plate 72 so that the flash 54 will be stripped off of the pins 60 by the plate 72 as the pins 60 are lowered below the plate 72. A sweeper bar assembly 76 is provided to sweep the loose flash 54 into a suitable receiving bin (not illustrated).

The card 30 can then be transferred to a remote station where further deflashing operations can be performed utilizing the surface 58A on the bottom of the card as a reference. To this end, the card 30 is deposited on a belt conveyor 80 (FIGS. 3 and 4) by the clamping members 64 so that the straight reference surface 58A rests on the conveyor belt. Suitable lateral guides 84 maintain the card 30 in a vertical orientation so that the vertical distance between the bottom of the card 30 on the conveyor and the containers 36 remains a constant, known amount and can be used for vertical alignment or registration of additional deflashing apparatus or container removal apparatus (not illustrated).

The lengthwise (i.e., horizontal) alignment of the card 30 can be established from a vertical reference surface 90A on the card 30 (FIG. 3). This vertical reference surface 90A is created along with the horizontal reference surface 58A when the bottom flash 54 is torn away from the card 30 by the pins 60. To this end, the card frangible web 58 (FIG. 1) is initially molded with a right angle shaped frangible web 90 offset from the horizontal web 58 (FIG. 1).

While the above-described process for producing flat reference surfaces at the bottom of a carrier or card works satisfactorily in the specific applications which it was designed, it does not work well with all types of thermoplastic materials. Further, the process can lead to the formation of particulate matter or other waste pieces which are generated by the tearing away of the bottom flash along the frangible web. This is not desirable in "clean room" production facilities where a sterile product is hermetically sealed within the containers by the molding, filling, and sealing machine.

Accordingly, it would be beneficial to provide an improved thermoplastic carrier/product structure which could be removed from a clean room environment after molding for further processing without first requiring deflashing operations or other operations in which the thermoplastic material is ruptured or severed.

Further, it would be beneficial if an improved method could be provided to readily accommodate the formation of a reference surface on the molded article without requiring deflashing operations at the mold assembly in a clean room environment.

In particular, it would be advantageous if such an improved system could provide a molded article with a uniform height so that further processing operations could be conducted with proper registration of the article at locations remote from the molding machine.

Further, it would be desirable to provide such an improved system with the capability for accommodating a variation in parison length as the parison is extruded between open mold halves.

It would also be desirable to provide a system for reducing the amount of thermoplastic material required for the carrier in which the containers are molded. With a conventional pin assembly having pins 60 as described above with reference to FIG. 3, the pins 60 must be relatively long and must engage a relatively long length of parison below the molded containers. This is necessary to establish a sufficient gripping engagement between the pins 60 and the thermoplastic material which can withstand the subsequent forces that are generated when the pins are lowered to pull the lower flash 54 away from the remaining portion of the card 30. This requires the use of a significant amount of thermoplastic material which ultimately may end up as discarded waste.

Another salutary feature of such an improved system would be its capability for accommodating various thermoplastic materials, such as high density polyethylene and polypropylene. While the use of long pins 60 works satisfactorily with some thermoplastic materials, such as low density polyethylene, it does not work well with other thermoplastic materials. For example, high density polyethylene and polypropylene exhibit greater strength and resistance to rupture at the frangible web 58. Excessive force is required to move the pins 60 downwardly in an attempt to break the high density polyethylene or polypropylene material at the frangible web. Even then, the break is not clean and straight. Thus, the desired flat reference surface is not easily formed with this kind of system when used with polypropylene and high density polyethylene.

It would also be advantageous to provide an improved system for forming the thermoplastic material in the card around the containers and in the peripheral flash with improved, and predictable, handling and severing characteristics. To this end, the system should provide an improved flow distribution of the thermoplastic material and an improved structure to accommodate the cooling of the molded material.

The present invention provides an improved article with a position-defining structure which can accommodate designs having the above-discussed benefits and features. Further, the present invention also provides an improved method and apparatus for making and processing such an article in ways which incorporate or exhibit the foregoing benefits and desired capabilities.

SUMMARY OF THE INVENTION

The present invention provides a novel article of manufacture which has special structure that accommodates its placement at a predetermined reference position for subsequent operations. The article may include molded objects such as thermoplastic containers which are formed, filled, and sealed in a thermoplastic carrier or card, and the like.

The article embodying this invention is provided with at least one molded reference surface which can be readily created during a form-fill-seal sequence in a clean room environment and without deflashing or other operations which sever or remove thermoplastic material. The structure of this novel article also readily accommodates transport on a conveyor system. Further, the novel article can be molded with a relatively shorter parison or parisons so as to conserve raw materials. Also, the article can be molded from a variety of materials, including high density polyethylene and polypropylene, with a structure that not only provides a molded reference surface but also accommodates improved flow distribution and cooling of the article during molding.

The article includes a molded thermoplastic carrier for a molded product package. The molded carrier includes at least one molded package, such as a sealed vial or container, and peripheral flash unitary therewith. The flash defines a generally V-shaped reference structure with an apex, and the flash diverges away from the apex and container while defining a reference surface for accommodating positioning of the article during subsequent operations.

In a preferred embodiment, the molded carrier includes a generally planar central wall and a pair of lower walls in the peripheral flash. These lower walls extend from a lower margin of the central wall in a generally inverted V-shape configuration to define the reference structure. The generally inverted V-shape diverges downwardly from an apex region. The apex region defines the reference surface from which a reference position can be established.

According to a method aspect of the present invention, a pliant molded article is provided between closed mold parts with flash extending beyond the closed mold parts. At least a portion of the extending flash is deformed against an anvil surface so as to form a reference surface in the extending portion of the flash. Thereafter, the article is cooled, and the reference surface can be used to establish a reference position of the article.

In a preferred form of the apparatus aspect of the present invention, anvil means are provided on the mold parts adjacent the parting plane for contacting the portion of the flash that extends beyond the mold parts when the mold parts are closed. The anvil means includes two anvil members each mounted on one of the mold parts to define generally diverging anvil surfaces when the mold parts are closed.

A molding means or deforming means is provided for deforming the flash against the anvil means so as to form the reference surface on the flash. The preferred form of the molding means includes a compressing ram having a pair of compressing surfaces in a generally inverted V-shaped configuration diverging from an apex region which forms the reference surface on the flash.

The novel article of the present invention can be readily transported by a conveyor system, and in particular, by a unique conveyor system designed to take full advantage of the molded reference surface. In this unique conveyor system, the article is positioned on a conveyor belt with the generally planar central wall oriented substantially vertically so that the belt lies within the reference structure and engages the reference surface. This serves to support the article at a predetermined reference position. Lateral guides are provided on each side of the article to prevent the article from tipping off of the belt. This method may be applied to a variety of molded articles.

In a preferred form of the method for transporting the article, the reference structure in the peripheral flash has a generally planar central wall and a pair of lower walls extending from a lower margin of the central wall. The lower walls extend in a generally inverted V-shaped configuration diverging away from an apex to define the reference surface which faces downwardly. The article is positioned with the planar central wall oriented generally vertically between the lateral guides and with the conveyor belt received between the diverging lower walls of the reference structure.

The apparatus for carrying out this method includes a conveyor belt, which in a preferred form, has a generally circular cross-section, and the apparatus includes means for operating the conveyor belt to convey the article. The lateral guides are preferably provided in the form of elongate members on each side of the belt to prevent the article from tipping off of the belt as the article is carried on the belt along and between the guides.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, and in which like numerals are employed to designate like parts throughout the same, FIG. 1 is a perspective view of a prior art card in the form of molded thermoplastic vials unitary with a thermoplastic carrier;

FIG. 2 is a simplified, partly diagrammatic, cross-sectional view showing the card of FIG. 1 in a closed mold assembly;

FIG. 3 is a simplified, fragmentary, partly diagrammatic, perspective view of the prior art card of FIG. 1 undergoing further processing after being removed from the mold assembly illustrated in FIG. 2;

FIG. 8 is a simplified, partly diagrammatic, fragmentary, top plan view of apparatus for molding and processing the card illustrated in FIG. 5;

FIG. 9 is a side elevational view, partly in cross-section, taken generally along the plane 9—9 in FIG. 8;

FIG. 10 is an enlarged, fragmentary, cross-sectional view taken generally along the plane 10—10 in FIG. 8;

FIG. 11 is a fragmentary, bottom plan view taken generally along the plane 11—11 in FIG. 10;

FIG. 12 is an enlarged, simplified, plan view taken generally along the plane 12—12 in FIG. 9;

FIG. 13 is a simplified, fragmentary, enlarged, cross-sectional view taken generally along the plane 13—13 in FIG. 8;

FIG. 14 is a fragmentary, simplified, enlarged, elevational view taken generally along the plane 14—14 in FIG. 8;

FIG. 15 is an enlarged, simplified, cross-sectional view taken generally along the plane 15—15 in FIG. 8 with a card shown in phantom with dashed lines;

FIG. 16 is a fragmentary, elevational view taken generally along the plane 16—16 in FIG. 10;

FIG. 16A is a fragmentary, cross-sectional view similar to FIG. 13 but showing the components in a moved position with the mold assembly closed and with the compressing member moving to an elevated position;

FIG. 17 is a view similar to FIG. 16A but showing the compressing member moved to the fully elevated position;

FIG. 18 is a greatly enlarged, fragmentary, cross-sectional view taken generally the plane 18—18 in FIG. 17;

FIG. 19 is a view similar to FIG. 17 but showing the mold assembly moving to an open position;

FIG. 20 is a view similar to FIG. 19 but showing a further step in the sequence of operation;

FIGS. 21–28 are simplified, fragmentary, partly diagrammatic, perspective views, partly in cross-section, of the apparatus illustrated in FIG. 8 and illustrating the sequence of operation of the apparatus to mold and process the card illustrated in FIG. 5.

DESCRIPTION OF THE PREFERRED EMBODIMENT

While this invention is susceptible of embodiment in many different forms, this specification and the accompanying drawings disclose only one specific form as an example of the invention. The invention is not intended to be limited to the embodiment so described, and the scope of the invention will be pointed out in the appended claims.

For ease of description, the article and apparatus of this invention are described in the normal (upright) operating position, and terms such as upper, lower, horizontal, etc., are used with reference to this position. It will be understood, however, that in some applications, other positions may be accommodated.

Some of the figures illustrating the apparatus of the invention show structural details and mechanical elements that will be recognized by one skilled in the art. However, the detailed descriptions of such elements are not necessary to an understanding of the invention, and accordingly, are not herein presented.

The apparatus of this invention is used with certain conventional components the details of which, although not fully illustrated or described, will be apparent to those having skill in the art and an understanding of the necessary functions of such components.

The present invention permits the molding of a novel article having a structure that incorporates a reference surface from which a reference position can be established. The reference surface can be formed at a molding machine in a clean room environment. The formation of the reference surface does not require deflashing operations (or other material removal operations) that could produce particulate contamination in the clean room environment.

The method and apparatus of the present invention can be employed to produce the molded article while accommodating variations in the length of the extruded parison and while generally permitting the use of shorter parisons so as to conserve molding material.

The method and apparatus are effective with a variety of thermoplastic materials, including high density polyethylene and polypropylene. The resulting article, in a preferred embodiment of the invention, has a structure that promotes good flow distribution of the thermoplastic material and subsequent cooling.

Another aspect of the invention provides a unique conveying system for conveying the article at a predetermined reference position.

Figure 4:
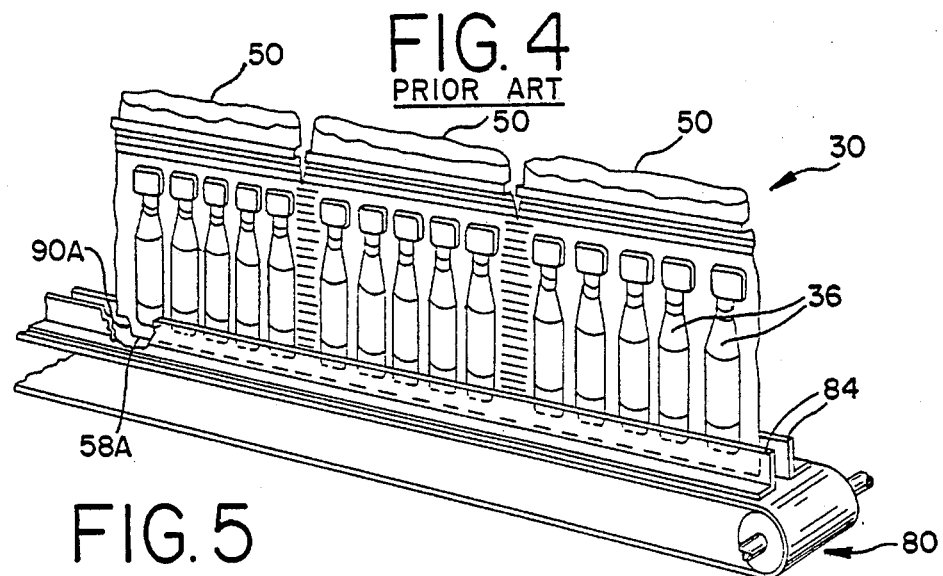
FIG. 4 is a fragmentary, simplified, partly diagrammatic, perspective view of the card assembly of FIG. 1 being transported on a conveyor.
Figure 5:
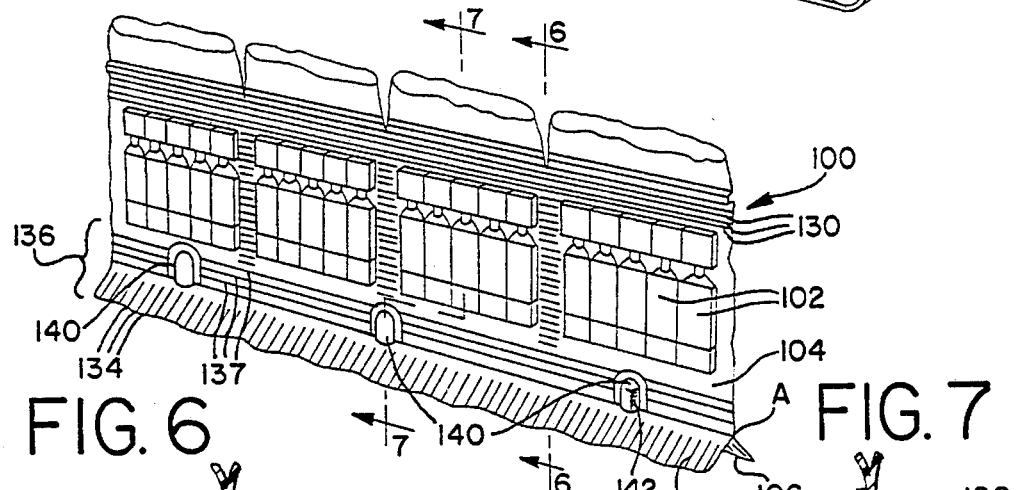
FIG. 5 is a perspective view of a card of the present invention wherein the card includes a thermoplastic carrier that is unitary with, and that supports, molded vials.
Figure 6:
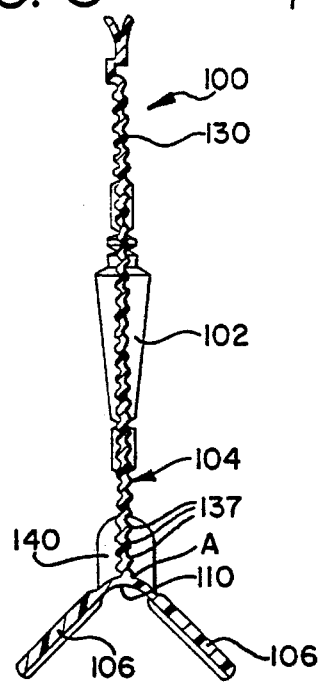
FIG. 6 is an enlarged, cross-sectional view taken generally along the plane 6—6 in FIG. 5.
Figure 7:
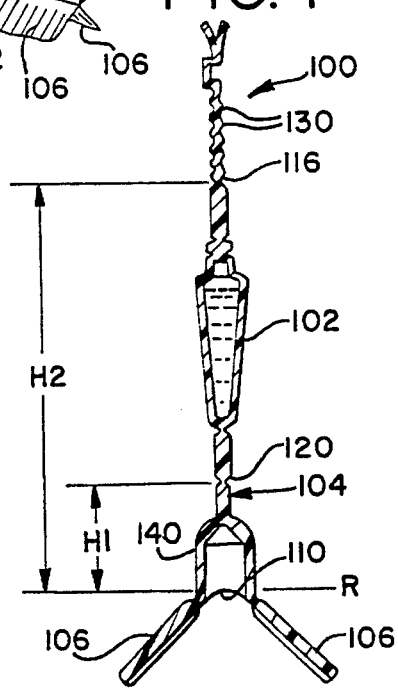
FIG. 7 is an enlarged, cross-sectional view taken generally along the plane 7—7 in FIG. 5.

An article in accordance with the teachings of the present invention is illustrated in FIGS. 5–7 in the form of a molded thermoplastic carrier or card 100. The card 100 is an article of manufacture that contains a plurality of containers or vials 102 unitary with the card 100 which, in turn, provides a unitary reference surface 110' for subsequent operations to be performed on the card or on the vials per se.

In particular, the card 100 has a generally planar central wall 104 and a pair of lower walls 106 which extend from a lower margin of the central wall 104 in a generally inverted V-shaped configuration. The walls 106 diverge from an apex region A which defines the reference surface 110 (FIGS. 6 and 7) from which a reference position can be established. The surface 110 faces generally outwardly or downwardly in the preferred orientation of molding the card 100 as illustrated in the figures. The card 100 is molded from a suitable thermoplastic material to provide the vials 102 in a formed, filled, and sealed state. A conventional form, fill, and seal process, such as that described above with reference to FIGS. 1–4, may be employed, along with the novel process of the present invention described in detail hereinafter, to form the card 100.

In particular, a conventional form, fill, and seal mold assembly of the type previously described herein may be employed to simultaneously mold a number of parisons to form the vials 102 in a unitary construction within the card 100. The vials 102 may be side-by-side as illustrated in FIG. 5 or may be spaced-apart somewhat as illustrated for the prior art card 30 in FIG. 4.

In any case, the periphery of each vial 102 in the card 100 is connected to the adjacent vial or portion of the card by means of a frangible web in the form of a reduced thickness section of material. FIG. 7 shows a frangible web portion 116 at the top of each vial and shows a frangible web portion 120 at the bottom of each vial. The upper frangible web portion 116 is located at a distance H2 from an apex of the reference surface 110, and the lower frangible web portion 120 is located at a distance H1 from the top of the reference surface 110.

In the illustrated preferred embodiment, the lower portion of the card 100 below the vials 102 includes the generally planar, unitary, central wall 104, the unitary lower walls 106, and the reference surface 110. Depending upon the orientation of the card 100 (which may depend from the orientation of the components of the form, fill, and seal apparatus described in detail hereinafter), the diverging walls 106 may be oriented laterally of, or even above, the vials 102 (as viewed in FIG. 7). That is, the card 100 may be molded in an orientation other than that shown. For example, with a bottom forming and filling system, the diverging walls 106 and reference surface 110 could be formed at the top of the card 100 (as viewed in FIG. 7). The card could then be subsequently inverted for conveying to subsequent processing stations.

In any event, the card 100 may be characterized as an article of manufacture comprising a sealed vial or container 102 having peripheral flash in which is defined a generally V-shaped reference structure that has an apex or apex region and that diverges away from the container while defining a reference surface 110. The diverging lower walls 106 need not be planar, and may be arcuate.

To aid in the flow distribution of the thermoplastic material during the molding process, the middle and upper portions of the card 100 are provided with horizontal serrations or corrugations 130 (FIGS. 5 and 6). The corrugations 130 also aid in cooling of the thermoplastic material and provide rigidity to the overall structure.

The lower walls 106 are formed, by means described in detail hereinafter, in the lower flash 136 (FIG. 5) of the parison portions which extend below the closed mold parts. The lower walls 106 are provided with transverse corrugations 134 (FIG. 5). As illustrated in FIGS. 5 and 6, the lower flash 136 above the walls 106 also includes a plurality of horizontal corrugations 137. The corrugations 134 and 137 promote good flow distribution of the thermoplastic material during molding, aid in cooling of the thermoplastic material, and provide rigidity.

The lower flash 136 also includes a plurality of hollow cavity formations 140 which are formed by means described in detail hereinafter. With reference to FIG. 5, the cavity formations 140 defined in the bottom region at the right-hand end of the card 100 also define a forwardly facing flat reference surface 142. This reference surface 142 is generally vertically oriented, and can be used to establish a reference position with respect to the horizontal location of the vials 102 unitary in the card 100.

The downwardly facing reference surface 110 (FIG. 6) preferably has an arcuate or partially cylindrical configuration as illustrated. This configuration accommodates engagement with a cylindrical support surface as will be described in detail hereinafter. It will be appreciated however, that the downwardly facing surface 110 could have other shapes, for example, a relatively flat shape.

In any case, the reference surface 110, as well as the vertical reference surface 142, may be used singly or collectively to establish a reference position of the card 100 for accommodating subsequent processing operations. For example, where the card 100 carries a plurality of unitary vials 102 as illustrated, the card 100 can be positioned relative to the surfaces 110 and 142 at a suitable apparatus for registering with, engaging, and removing the containers 102 from the card 100. Also, the reference surfaces 110 and 142 may be similarly used in conjunction with other processing apparatus, such as with label applying apparatus for assuring registration of labels relative to the containers 102.

A process and apparatus for making the card 100 is illustrated with reference to FIGS. 8–28. As illustrated in plan view in FIG. 8, the apparatus is employed with a form, fill, and seal molding machine having a mold assembly 240 that includes a pair of split, main mold halves 242 and 244 which are adapted to move between open and closed positions below a multiple head extruder 250 (FIG. 21). The extruder 250 has a plurality of extruding heads 252 for extruding parisons 254 between the mold halves 242 and 244. The molding machine also includes a mandrel assembly 260 which carries a plurality of composite blowing and filling mandrels 262 (FIG. 21).

The machine mold assembly 240, extruder 250, mandrel assembly 260, and related mechanisms may be of any suitable conventional or special design. Conventional molding machines have been described above in the section entitled "Background Of The Invention And Technical Problems Posed By The Prior Art." The detailed designs and specific structures of such molding machines form no part of the present invention. The above-identified components of a conventional machine will next be further described to the extent necessary to show their relationship to, and employment with, the apparatus of the present invention.

The main mold half 242 is carried by a frame 282, and the main mold half 244 is carried by a frame 284. The frames 282 and 284 are movable on tie rods 146 and 148 by suitable hydraulic actuators (not illustrated) which may be of conventional or special design and incorporated in the molding machine to move the frames, and hence mold halves 242 and 244, toward and away from each other as illustrated by the double headed arrow 286 in FIG. 8.

The machine also includes conventional parison grippers (not illustrated) for holding the top of the parison open, and includes upper sealing molds (not illustrated) for sealing the parison closed after the containers are molded and filled. These components can be carried on the main mold halves 242 and 244 or directly on the frames 282 and 284. The detailed design and operation of such conventional components form no part of the present invention.

The frame 282 includes an extension to which is mounted a clamping member 292, and the frame 284 includes an extension to which is mounted an opposing clamping member 294. The clamping members 292 and 294 are adapted to clamp the top portion of a molded card (FIGS. 20 and 22) as will be explained in detail hereinafter.

The clamping member 292 is mounted with two shaft assemblies 291 to the frame 282, and the clamping member 294 is mounted with two shaft assemblies 293 to the frame 284. Preferably, the shaft assemblies are conventionally spring-loaded so that the clamping members 292 and 294 are normally biased toward each other by compression springs (not visible in the figures) which are in the mounting shaft assemblies. The travel of each clamping member away from its frame 282 or 284 is limited by suitable tie rod structures (not visible in the figures). The detailed design and arrangement of the components of such a conventional spring-loaded clamping system form no part of the present invention.

The molding machine tie rods 146 and 148 are mounted in a movable carriage (not illustrated) so that the frames 282 and 284 can be moved, with the associated mold halves and clamping members, between a parison-receiving position (illustrated in FIGS. 8, 9, 21, 22, and 23) and a molding position (illustrated in FIGS. 24–28). To this end, the machine includes suitable mechanisms (not illustrated) which may be of conventional or special design for moving the carriage with the frames 282 and 284 (and attached components) in the direction of the arrow 298 (FIG. 9) to the molding position illustrated in FIG. 24 and then back to the parison-receiving position illustrated in FIGS. 8 and 9.

The novel reference surface 110 is formed in the card 100 by deformation of the thermoplastic material against a unique anvil means on the mold halves 242 and 244. As illustrated in FIG. 10, the anvil means includes an anvil member 302 mounted to the bottom region of the main mold half 242 and an anvil member 304 mounted to the bottom region of the main mold half 244. The anvil member 302 defines an anvil surface 306, and the anvil member 304 defines an anvil surface 308. When the mold halves 242 and 244 are closed as illustrated in FIG. 16A, the anvil surfaces 306 and 308 form a generally diverging configuration.

Each anvil member 302 and 304 includes serrations or corrugations 312 (FIG. 11) which promote good flow distribution of the thermoplastic material during formation of the reference surface on the card 100 as will be described in detail hereinafter.

In addition, the anvil member 302 includes a vertically extending wall having horizontal serrations or corrugations 314 (FIG. 10), and the anvil member 308 has a similar vertical surface with corrugations 316. The corrugations 316 are vertically offset with respect to the corrugations 314 so that, when the mold halves 242 and 244 are closed (FIG. 17), the thermoplastic material is deformed into a configuration having the horizontal corrugations 137 (FIGS. 5 and 6). This promotes flow of the thermoplastic material, aids in subsequent cooling, and imparts rigidity to the card 100.

Each anvil member 302 and 304 also defines receiving cavities 320 for receiving portions of a novel deforming means or forming assembly 330 (FIGS. 8–10). The forming assembly 330 is located below the mandrel assembly 260 as illustrated in FIG. 9. The forming assembly 330 includes a forming block or compressing ram 344 which is adapted to be moved vertically up and down in the direction of the double headed arrow 334 (FIG. 9). When the main mold halves 242 and 244 are moved laterally to the molding position (FIG. 24), the ram 344 of the forming assembly 330 is directly below, and in alignment with, the anvil members 302 and 304 (FIGS. 10, 16A, 17, and 19).

The detailed structures and mechanisms for supporting and moving the compressing ram 344 upwardly and downwardly may be of any suitable conventional or special design that preferably includes an appropriate stop means. The details of such structures and mechanisms, although not fully illustrated or described, will be apparent to those having skill in the art and an understanding of the necessary functions of such structures and mechanisms. While the detailed descriptions of such structures and mechanisms are not necessary to an understanding of the invention, an illustrative arrangement for this purpose is shown in FIG. 9.

Specifically, the ram 344, which has a unique configuration described in detail hereinafter, is mounted to the upper ends of support rods 335 which are slidably disposed in guide sleeves 333 carried by a guide frame 340 that is part of the machine frame. The lower ends of the support rods 335 are mounted to a carriage 336.

The carriage 336 is slidably mounted for vertical reciprocation on a pair of guide rods 337 which are supported from the frame 340. In particular, the lower portions of the guide rods 337 are mounted in a stationary support member 338 which is defined at the lower portion of the frame 340 adjacent the guide rods 337 and carriage 336. The carriage 336 can be vertically reciprocated on the guide rods 337 by means of a suitable piston-cylinder type hydraulic actuator 339 which is mounted to the support member 338. This effects vertical movement of the ram 344.

The carriage 336 carries an upwardly projecting, rigid, stop member 341 which is aligned with a stop or abutment 342 mounted to the underside of the upper portion of the guide frame 340. The upper, distal end portion of the stop member 341 is preferably threadingly mounted to the lower portion of the stop member so that the overall height of the stop member 341 can be adjusted. The stop member 341 and abutment 342 function to limit the upward movement of the ram 344 relative to the mold anvil members 302 and 304 (FIGS. 10, 16A, 17 and 19). Hence, this establishes the location of the apex reference surface 110 relative to the mold halves 242 and 244.

After the containers 102 have been formed, filled, and sealed in the molded card 100 between the closed mold halves 242 and 244 in the position over the forming assembly 330 as shown in FIG. 25, the compressing ram 344 is elevated to the extent permitted by the stop member 341 and abutment 342 (FIG. 9). At that elevation the ram 344 presses against the mold flash extending between the anvil members 302 and 304. This forms the reference surface 110 (FIG. 7) and diverging lower walls 106. To this end, the compressing ram 344 has a pair of compressing surfaces 352 and 354 (FIGS. 12 and 16A) which define a generally inverted V-shaped configuration diverging from an apex region 356 which forms the reference surface 110 in the card 100.

The compressing ram 344 also includes a plurality of upwardly projecting pins 362 (FIGS. 9, 10, and 12). Each pin 362 is received in a mating pair of the cavities 320 defined by the anvil members 302 and 304 when the main mold halves 242 and 244 are closed (FIGS. 16A and 17).

As shown in FIG. 12, the ram compressing surfaces 52 and 354 each have a plurality of serrations or corrugations 366 which are offset relative to the serrations 312 in the anvil surfaces 306 and 308 (FIG. 11). Thus, when the compressing ram 344 is fully elevated against the flash at the bottom of the mold assembly as illustrated in FIGS. 17 and 18, the card lower walls 106 are formed with the corrugations 134. The corrugated surfaces of the compressing ram 344 and of the mating surfaces of the anvil members 302 and 304 facilitate the flow of the thermoplastic material as it is deformed. Subsequent cooling is enhanced, and the resulting corrugated structure of the card lower walls 106 exhibits increased rigidity.

When the compressing ram 344 is elevated to press the thermoplastic material against the anvil members 302 and 304 as illustrated in FIG. 17, the pins 362 are received in the anvil member cavities 320 (FIGS. 16A and 19), and this forms the domed cylindrical forms 140 (FIG. 5). The vertical reference surface 142 on the form 140 at the end of the card 100 (at the right-hand end as viewed in FIG. 5) is created by the compression of the thermoplastic material against a flat surface 321 (FIG. 16) in each of the end cavities 320 in the anvil members 302 and 304.

If desired, depending upon the size of the components and the materials being molded, passageways may be provided through the compressing ram 344 and through the anvil members 302 and 304 for accommodating flow of a liquid coolant. In the illustrated embodiment, where the anvil members 302 and 304 and the compressing ram 344 are fabricated from aluminum bronze, the ram 344 is provided with two, parallel, ⅛inch diameter coolant flow passages 367 through which water is pumped. For ease of illustration, conventional water supply hoses have been omitted from the figures.

A novel conveyor mechanism is provided for receiving the molded card 100, and the conveyor mechanism is illustrated in plan view in FIG. 8 wherein it is designated generally by reference numeral 400. As illustrated in FIGS. 14 and 15, the conveyor mechanism 400 includes an O-ring type conveyor belt 402 which has a generally circular cross-section and which is trained around pulleys 404 and 406. The pulleys 404 and 406 are mounted through conventional shaft and bearing systems (not illustrated in detail) to a suitable support frame (not illustrated). One of the pulleys is driven by a conventional motor (not illustrated) to effect rotation of the belt 402. The detailed descriptions of such conveyor frame and drive components are not necessary to an understanding of the invention and are not herein presented as the details of such structures and components form no part of the present invention.

The conveyor 400 also includes lateral guides or guide bars 410 (FIGS. 8, 15, and 21). The guide bars 410 are supported above the upper run of the conveyor belt 402 and are disposed in a laterally spaced-apart relationship on either side of the belt 402.

The sequential steps of molding and processing the novel carrier or card 100 and the sequential operation of the relevant portions of the apparatus will next be described with reference to the sequence illustrated in FIGS. 21–28. Initially, the mold assembly 240 is located, as shown in FIG. 21, below the extruder 250 with the mold halves 242 and 244 opened to receive the downwardly hanging parisons 254. A previously molded card 100 is shown engaged with the compressing ram 344 which supports the card 100 below the elevated mandrel assembly 260. The clamping members 292 and 294 are in an opened position around, but spaced away from, the upper portion of the card 100.

The parisons 254 are extruded from a suitable thermoplastic material by the extruder head. The present invention has been found to work well with polypropylene and high density polyethylene as well as with low density polyethylene.

After the parisons have been extruded, the main mold halves 242 and 244 are moved to the closed position about the parisons 254 as illustrated in FIG. 22 to begin formation of a second card. The main mold frames 282 and 284 are moved on the tie rods 246 and 248 in the directions of arrows 493 and 495 by conventional actuators (not illustrated) to move the main mold halves to the closed position and to also move the clamping members 292 and 294 to the closed position to clamp the upper portion of the previously formed card 100. The detailed design and operation of such conventional actuators form no part of the present invention.

When the main mold halves 242 and 244 are in the closed position as illustrated in FIG. 22, suitable vacuum operable holding jaws or grippers (not illustrated), which can be carried on the main mold halves, are brought into engagement with the upper portion of the parisons 254 above the closed mold halves 242 and 244. Such devices grip the parison 254 by means of reduced pressure or vacuum (as effected by suitable conventional means not illustrated) between the surface of the parisons 254 and the surfaces of the gripping mechanisms. Such mechanisms are well known in the art, and the details of such mechanisms form no part of the present invention.

Pressurized air may be discharged from the extruder head 250 through a suitable conventional tube (not illustrated) to expand the parisons 254 slightly so that the parisons 254 come into contact with the gripping mechanisms. This parison expansion process is conventional and well known to those skilled in the art.

When the peripheral exterior surfaces of the upper portions of the parisons 254 are held by the gripper mechanisms above the mold halves 242 and 244, the upper portions of the parisons are prevented from collapsing inwardly. At this point, the parisons 254 can be severed, above the holding mechanisms, in a conventional manner (e.g., by means of a moving cutter, such as a hot wire or the like). For ease of illustration, such a cutter mechanism is not illustrated, but conventional designs are well known to those skilled in the art. The detailed design and operation of such cutter mechanisms form no part of the present invention.

During the period of time that the parisons 254 are being severed from the extruder head 250 above the closed molds 242 and 244, the previously formed first card 100 remains clamped between the adjacent, closed clamping members 292 and 294. With the first card 100 so clamped, the compressing member 344 is lowered as indicated by the arrow 500 in FIG. 23. This serves to disengage the compressing surfaces 352 and 354 and the pins 362 from the bottom portion of the card 100. Since the pins 362 are relatively short, they can be relatively easily disengaged from the solidified thermoplastic material, even polypropylene.

After the compressing ram 344 is disengaged from the bottom of the first card 100, the machine frames 282 and 284 are moved to (1) align the closed, main mold halves 242 and 244 (with the severed parisons 254 carried therein) below the composite mandrel assembly 260 and (2) position the first card 100 over the conveyor 400 as illustrated in FIG. 24. This movement is effected in the direction of the arrow 502 (FIG. 24) by conventional actuators (not illustrated) well known to those of ordinary skill in the art. The detailed design and operation of such conventional actuators form no part of the present invention.

The main mold halves 242 and 244 are positioned as shown in FIG. 24 to align the parisons and surrounding mold cavities with the composite mandrels 262 located above the main mold halves 242 and 244 and with the lowered compressing ram 344 located below the main mold halves 242 and 244.

When the main mold halves are in position below the mandrel assembly 260 as illustrated in FIG. 24, the first card 100, which is still clamped between the clamping members 292 and 294, overlies an end portion of the conveyor 400 and is elevated slightly above the upper run of the conveyor belt 402.

Next, as illustrated in FIG. 25, the mandrel assembly 260 is operated to extend the composite mandrels 262 in the direction of arrow 510 into the open, upper end portions of the parisons 254. It is to be realized that the upper end portions of the parisons 254 are still maintained in an open orientation and prevented from collapsing inwardly by means of suitable conventional or special parison grippers (not illustrated) above the main mold halves 242 and 244. The gripping mechanisms have been omitted from the figures for ease of illustration.

The composite mandrels 262 engage the inner peripheries of the parison top openings. Each mandrel 262 seals a parison top opening and presses the parison against the closed, main mold halves 242 and 244.

In the embodiment illustrated, each mandrel 262 includes a conventional blowing tube and a conventional filling tube (not visible in the figures). Designs for such mandrels, including the designs of the blowing and filling tubes as well as the mechanisms for moving the mandrel assembly and operating the mandrels, may be of a suitable conventional design such as disclosed in the U.S. Pat. No. 3,919,374 and/or found in commercial machines that incorporate such mechanisms. The detailed design and operation of such mechanisms form no part of the present invention.

In operation, compressed gas, such as air or the like, is discharged through the mandrel blowing tube within the mandrel 262 and into the interior of the hollow parison to inflate the parison outwardly against the walls of the cavity defined by the main mold halves 242 and 244 ——with or without vacuum assist through small passageways in the mold halves. The compressed gas is typically discharged for about one second.

Next, the filling tube (not visible in the figures) inside each composite mandrel 262 is moved downwardly to open a vent passage in the mandrel to permit venting of the compressed gas out of the molded container. Subsequently, a blowing tube (not visible in the figures) is moved downwardly a small amount within each mandrel 262 to open a product dispensing valve and permit the product to be injected under pressure from the filling tube into the formed container.

The product, typically a liquid, is usually at a relatively lower temperature than the parison, and this assists in solidifying the walls of the formed container. After the formed containers have been filled with the desired amount of product, the composite mandrels 260 are withdrawn from the open ends of the parisons. FIG. 26 illustrates the composite mandrels 262 retracted in the direction of the arrow 516 to the elevated position above the main mold halves 242 and 244. If it is desired to form an unfilled container, the filling procedure, of course, is omitted from the manufacturing process.

After the composite blowing and filling mandrels 262 have been elevated to a position above the mold halves and gripping jaws, the open top ends of the parisons 254 are sealed closed by suitable sealing molds (not illustrated). For ease of illustration, the sealing molds on top of the main molds 242 and 244 have been omitted. The sealing molds close together to form the closed top of each container in a well-known manner. The detailed design and operation of such sealing molds form no part of the present invention.

The sealing molds may also form, in a conventional, well-known manner, a frangible web in the upper portion of the sealed closed container. Such a frangible web is defined by a reduced thickness section of the molded material around a peripheral portion of the container that forms a zone of weakness. It permits the container to be opened by twisting off the top portion of the container.

The main molds and sealing molds also operate to create a reduced thickness section of material at the mold parting plane vertically around the periphery of each container. Each container is thus unitary with the entire second carrier or card by means of the reduced thickness section of molding material at the parting plane, but each container can be subsequently easily removed from the surrounding card by punching or knocking the container so as to break the reduced thickness section of material and permit the container to fall away from the card at a suitable deflashing station.

The main mold halves 242 and 244, when closed, also create the corrugations 130 (FIG. 5) and other conventional mold formations on and around the containers 102 as may be desired.

When the main mold halves 242 and 244 are in the closed position, the anvil members 302 and 304 are also in the closed position as illustrated in FIG. 16A. The anvil members 302 and 304 thus effect the formation of the horizontal corrugations 137 along the bottom of the card by means of the anvil corrugations 314 and 316 (FIG. 10).

As the mandrel assembly 260 is retracted upwardly (FIG. 26), the compressing ram 344 is moved upwardly (in the direction of arrow 521 shown in FIG. 26) against the anvil members 302 and 304 (FIG. 17) to imbed the pins 362 in the thermoplastic material along the bottom portion of the card and to deform the thermoplastic material against the anvil members 302 and 304 to form the reference surface 110 and the diverging lower walls 106 of the card. Owing to the offset relationship between the compressing ram corrugations 366 (FIG. 12) and the anvil member corrugations 312 (FIG. 11), each wall 106 of the card is formed with the corrugations 134 (FIG. 18).

The ram 344 is moved upwardly, by means previously described, until the stop member 341 (FIG. 9) engages the abutment member 342 (FIG. 9). This establishes the elevation of the reference surface 110 relative to the anvil members 302 and 304.

After the reference surface 110 and lower walls 106 of the second card have been formed by the compressing ram 344, the molding machine is opened by moving the frames 282 and 284 outwardly in the directions of the double headed arrow 520 (FIG. 27). This moves the mold halves 242 and 244 apart and moves the clamping members 92 and 294 apart. This exposes the elevated ram 344 which supports the newly formed, second card 100' between the opened mold halves 242 and 244. The card 100' is supported on the ram 344 by virtue of the engagement between the compressing ram surfaces 352 and 354 and pins 362 with the solidified thermoplastic material along the bottom margin of the card 100'.

As the clamping members 292 and 294 open with the main mold halves, the previously formed card 100 drops away from the clamping members down onto the upper run of the conveyor belt 402 (FIG. 27). As illustrated in FIG. 15, the pair of lower walls 106 of the card straddle the conveyor belt 402, and the curved reference surface 110 rests on the cylindrical surface of the conveyor belt 402 so as to support the card 100 at a predetermined reference position. The elevation of any part of the card, such as the bottom edge or top edge of a container 102, is thus readily established from the top of the conveyor belt 402.

The conveyor 400 can transport the card 100 at the reference elevation defined by the top of the conveyor belt 402 to further processing stations. Such further processing stations can include deflashing stations for removing the containers from the surrounding portions of the card.

In addition, or alternatively, the card 100 can be transported by the conveyor 400 to other downstream processing apparatus, such as label applying apparatus or the like, which can act upon the containers at selected elevations above the reference position established by the top of the conveyor belt 402.

Typically, appropriate knock-out members or punch members are aligned in registry with the containers, or portions thereof, to knock the containers free of the surrounding portions of the card 100. To this end, such knock-out apparatus is vertically aligned with respect to the reference position defined by the top of the conveyor belt 402 so as to engage the containers at the appropriate elevation on the card. Such apparatus can also be horizontally aligned relative to the containers with respect to the vertical reference surface 142.

After the clamping members 292 and 294 and main mold halves 242 and 244 have opened, the compressing ram 344 is lowered relative to the open mold halves 242 and 244 (in the direction of arrow 530 in FIG. 28). The compressing ram 344 is maintained at a lower elevation that aligns the upper margin of the newly formed card 100' with the laterally displaced clamping members 292 and 294 as illustrated in FIG. 28. With the card 100' held in this position, the mold machine can be returned to the parison-receiving position as illustrated in FIG. 21 wherein the open mold halves 242 and 244 are again positioned below the extruder head 250 and wherein the open clamp members 292 and 294 are again positioned below the mandrel assembly 260 and around the upper margin of the new card 100'. The sequence of operation can then be repeated.

The method and apparatus of the present invention operates efficiently to form an article having a structure that accommodates its disposition at a predetermined reference position for subsequent operations. A unique reference surface is molded in the article in a controlled manner to accommodate transport on a conveyor in a predetermined and reproducible orientation and position.

The present method and apparatus can be effectively used with a variety of thermoplastic materials, e.g., polyolefins, including polypropylene and high density polyethylene, as well as low density polyethylene. Further, a variation in parison length can be accommodated. In general, relatively shorter parison lengths may be employed for a given vial size so as to conserve raw material.

It will be readily observed from the foregoing detailed description of the invention and from the illustrations thereof that numerous variations and modifications may be effected without departing from the true spirit and scope of the novel concepts or principles of this invention.

What is claimed is:

1. A thermoplastic, molded article of manufacture which comprises a sealed container formed therein and having a peripheral elongate flash unitary therewith, said flash defining a molded reference structure adapted to engage a conveyor for conveying said molded article and performing subsequent operations on said article, said molded reference structure includes a planar elongate central wall of a frangible web extending longitudinally along the length thereof and unitary with said container along an upper longitudinal edge of said central wall and a pair of elongate lower walls which diverge away from a lower longitudinal edge of said central wall in an inverted V-shaped configuration.

2. The article in accordance with claim 1 wherein an apex reference surface is defined in the region of said V-shaped configuration where said lower walls diverge from said central wall.

3. The article in accordance with claim 2 wherein said apex reference surface is configured for engagement with a cylindrical conveyor support surface of said conveyor.

4. The article in accordance with claim 1 wherein said central wall and said lower walls include spaced corrugations formed therein.

5. The article in accordance with claim 1 wherein said central wall includes a plurality of horizontally spaced corrugations formed therein and said lower walls include a plurality of vertically spaced corrugations formed therein.

6. The article in accordance with claim 3 wherein said apex reference surface is partially cylindrical.

7. The article in accordance with claim 3 wherein said apex reference surface is flat.

* * * * *